United States Patent
Abrashkevich et al.

(10) Patent No.: US 8,032,736 B2
(45) Date of Patent: Oct. 4, 2011

(54) METHODS, APPARATUS AND ARTICLES OF MANUFACTURE FOR REGAINING MEMORY CONSISTENCY AFTER A TRAP VIA TRANSACTIONAL MEMORY

(75) Inventors: Alexander Abrashkevich, Richmond Hill (CA); Dmitri Abrashkevich, Richmond Hill (CA); Robert J. Blainey, Newmarket (CA); Thomas J. Heller, Jr., Rhinebeck, NY (US); Matthew A. Huras, Ajax (CA); Sridhar Munireddy, Bangalore Ka (IN); Yogendra K. Srivastava, Bangalore Ka (IN); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/037,888

(22) Filed: Feb. 26, 2008

(65) Prior Publication Data

US 2009/0217018 A1 Aug. 27, 2009

(51) Int. Cl.
*G06F 9/40* (2006.01)
*G06F 9/48* (2006.01)

(52) U.S. Cl. ...................................... 712/228; 712/244
(58) Field of Classification Search .................. 712/228, 712/244
See application file for complete search history.

(56) References Cited

U.S. PATENT DOCUMENTS

| | | | | |
|---|---|---|---|---|
| 5,257,358 | A * | 10/1993 | Cohen | 714/38 |
| 5,909,574 | A | 6/1999 | Meyer | |
| 6,681,280 | B1 * | 1/2004 | Miyake et al. | 710/261 |
| 7,512,772 | B2 * | 3/2009 | Gschwind et al. | 712/227 |
| 2003/0135720 | A1 * | 7/2003 | DeWitt et al. | 712/228 |
| 2004/0162967 | A1 | 8/2004 | Tremblay et al. | |
| 2006/0117316 | A1 * | 6/2006 | Cismas et al. | 718/103 |
| 2006/0179207 | A1 * | 8/2006 | Eisen et al. | 711/100 |
| 2007/0143755 | A1 | 6/2007 | Sahu et al. | |
| 2007/0162520 | A1 | 7/2007 | Petersen et al. | |
| 2007/0186056 | A1 | 8/2007 | Saha et al. | |

* cited by examiner

*Primary Examiner* — Daniel Pan
(74) *Attorney, Agent, or Firm* — Patterson & Sheridan, LLP (57) ABSTRACT

Embodiments of the invention provide a method for regaining memory consistency after a trap via transactional memory. Transactional memory and a transactional memory log are used to undo changes made to memory from a transaction start point up to the point of a trap event. After the trap event is processed, and the changes are rolled back, the program can resume execution at the beginning of the transaction.

24 Claims, 9 Drawing Sheets

516 → newNode.prev = node 1;  Step 1
518 → newNode.next = node1.next;  Step 2
520 → newNode.prev.next = new Node;  Step 3  — Trap Event
522 → newNode.next.prev = new Node;  Step 4  (not reached)

FIG. 5

TRANSACTIONAL MEMORY LOG

| MEMORY CONTENT OF: | OLD VALUE | NEW VALUE |
|---|---|---|
| newNode.prev | NULL | node 1 |
| newNode.next | NULL | node1.next |
| newNode.prev.next | node 2 | newNode |

FIG. 6

716 ⟶ newNode.prev.next = node 2;   Step 1

718 ⟶ newNode.next = NULL;   Step 2

720 ⟶ newNode.prev = NULL;   Step 3

RESTORED TO SAFE POINT

METHODS, APPARATUS AND ARTICLES OF MANUFACTURE FOR REGAINING MEMORY CONSISTENCY AFTER A TRAP VIA TRANSACTIONAL MEMORY

BACKGROUND OF THE INVENTION

1. Field of the Invention

Embodiments of the present invention generally relate to a method for regaining memory consistency after a trap using transactional memory and a transactional memory log.

2. Description of the Related Art

Concurrent computing generally refers to the simultaneous execution of multiple tasks, usually on a multiprocessor system. These tasks are often implemented by a set of threads (short for "thread of execution") contained by a process (an executing computer program). The threads of a particular process often access the same data structures in memory. Allowing multiple threads to access the same data structures may lead to consistency problems and locking techniques are often used to prevent threads from interfering with each other and corrupting memory. For example, if a first thread is modifying a particular data structure in memory, then the data structure may be "locked" to prevent a second thread from accessing or modifying the data structure until the lock is released. Locking, however, is particularly pessimistic. That is, the data structure remains locked to the second thread regardless of whether concurrent access by both threads would lead to an inconsistency.

Further, a locking mechanism may not prevent certain particular types of consistency errors. For example, consider a thread configured to add an element to a doubly linked list. Typically, such a thread would perform the following steps (set forth in a pseudo code format):

```
Add_element {
    newNode->previous = node;
    newNode->next = node->next;
    node->next->previous = newNode;
    node->next = newNode; }
```

The first two lines insert the newNode element following the node element and set pointers for the newNode element to the appropriate previous and subsequent elements in the list. The third and fourth line adjusts pointers in the previous and next elements in the list to point to the newNode element. Because concurrent access to these elements could lead could lead to inconsistent results, a locking mechanism may be used to protect the list while the Add_element routine is performed.

However, if a trap event occurred part way through these steps, a locking mechanism might not prevent the list from being left in an inconsistent state. For example, consider the following sequence of program flow:
1. Lock the doubly linked list.
2. Invoke the Add_element routine to add a new element
3. Part way through the Add_element routine, a trap event occurs causing program control to jump to a known jump point previously set for the trap event.
4. Unlock (not reached).

In this example, the thread stack is correct, and further processing could occur. However, this sequence leaves the linked list in an inconsistent state and locked. There is no effective mechanism to unlock the list and undo the partial update to the linked list that occurred prior to the trap event. Thus, in cases such as this, unpredictable results may occur depending on how the doubly linked list is parsed, or the application may simply terminate if an application thread subsequently attempted to dereference an uninitialized node pointer.

SUMMARY OF THE INVENTION

One embodiment of the invention includes a method for regaining memory consistency after a trap event. The method may generally include a first thread initiating a transaction which includes a plurality of instructions. The method may also include recording a sequence of changes made to memory while executing the plurality of instructions and detecting the occurrence of a trap event prior to completing the transaction. The method further include rolling back the sequence of changes made to the memory up to a first instruction of the transaction, based on the recorded sequence and resuming execution of the thread at the first instruction of the transaction.

Another embodiment of the invention includes a computer-readable storage medium containing a program, which, when executed performs an operation for regaining memory consistency after a trap event. The operation may generally include a first thread initiating a transaction which includes a plurality of instructions, recording a sequence of changes made to memory while executing the plurality of instructions, and detecting the occurrence of a trap event prior to completing the transaction. The operation may generally further include rolling back the sequence of changes made to the memory up to a first instruction of the transaction, based on the recorded sequence and resuming execution of the thread at the first instruction of the transaction.

Still another embodiment of the invention includes a system having a processor, a transactional memory, and a transactional memory manager configured to perform an operation for regaining memory consistency after a trap event via the transactional memory. The operation may generally include a first thread initiating a transaction which includes a plurality of instructions, recording a sequence of changes made to the transactional memory while executing the plurality of instructions, detecting the occurrence of a trap event prior to completing the transaction. The operation may generally further include rolling back the sequence of changes made to the transactional memory up to a first instruction of the transaction, based on the recorded sequence and resuming execution of the thread at the first instruction of the transaction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide for regaining memory consistency after a trap via transactional memory. Transactional memory provides a method to control thread access to shared memory (i.e., to data structures stored in the shared memory). Using transactional memory, threads may modify data structures in shared memory without regard to what other threads are doing. That is, without regard to whether a given data structure in memory is locked. However, each read and write to the shared memory is recorded in a transactional log. After the series of steps included in the transaction has completed, a reader verifies that other threads have not made changes to the accessed memory. Alternatively, the verification may occur in real time as the instructions are being executed. One implementation could do the verification at the end while another could do it during each read/write instruction. If no changes have been made, then the changes made as part of the transaction are made permanent (committed). Otherwise, the transaction is aborted, and all changes to the memory are undone by rolling back through the log step-by step. Thus, where a locking technique prevents another thread from accessing the same data structure, transactional memory allows multiple threads to simultaneously modify different parts of the same data structure. For example, two threads may simultaneously modify different nodes of the same linked list. So long as each thread is modifying different nodes of the list, both transactions may be performed concurrently.

In one embodiment, transactional memory and a transactional memory log are used to undo changes made to memory from a transaction start point up to the point of a trap event. After the trap event is processed, and the changes are rolled back, the program can resume execution at the beginning of the transaction. In some cases, the trap event may be the result of an interrupt external to program operation (e.g., a keyboard interrupt generated when a user press <ctl>-c). In such cases, the program may continue execution without resulting in another trap event during the transaction. In other cases, however, the trap event may be the result of errors generated by steps performed as part of the transaction (e.g., a floating point divide-by-zero error). Thus, when the program is rolled back and execution restarts, the same trap event may reoccur. In such a case, a threshold value may also be used to prevent an infinite loop of rolling back memory changes. Along with the threshold value, other details may be provided to indicate "why" the code is back at the beginning (such as a numeric value indicating the cause) so that the source code can decide when to give up or even do something even more advanced and then try again.

As used herein, a "trap" generally refers to an event that interrupts the execution of a thread, in particular, where the thread is executing a multi-instruction transaction when the trap event occurs. As used herein, a "transaction" refers to a related sequence of program code or instructions, e.g., a transaction of adding an element to a doubly linked list. Typically, the entire transaction should be completed (i.e., each instruction should be performed without interruption) or the transaction should be aborted. It is often necessary to roll back memory changes after a trap in order to restore memory consistency. For example, if a new node is being inserted into a linked list, a trap may interrupt the insertion, resulting in inconsistent memory values. The new node may only be partially inserted. In such a case, some of the pointers in the linked list may be incorrect or inconsistent. In one embodiment, therefore changes made to memory are rolled back using a transactional memory log. Once the changes are undone, the program can resume execution and attempt to re-insert the node. In one embodiment, the program may be terminated after a certain number of consecutive attempts are unsuccessful.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
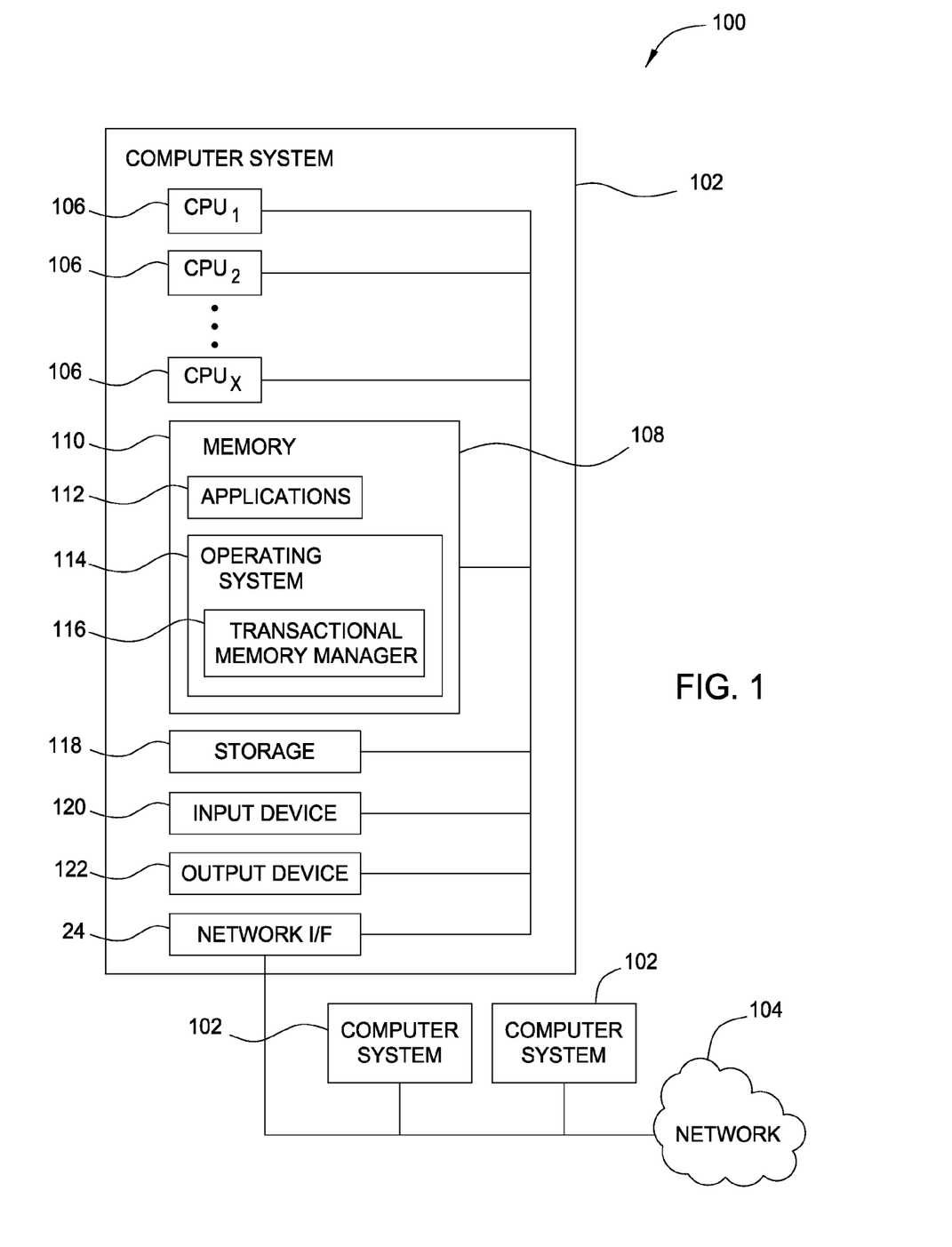
FIG. 1 is a diagram illustrating an example of components of a computer system, according to one embodiment of the invention.

FIG. 1 is a diagram illustrating an example of components of a computer system 102, according to one embodiment of the invention. As shown, computer system 102 includes one or more central processing units (CPUs) 106 connected by a bus to memory 110, storage 118, input devices 120, and output devices 122. Computer system 102 is typically running an operating system 114 configured to manage interaction between the computer hardware and the higher-level software applications. The operating system 114 may also contain a transactional memory manager 116 to manage the software transactional memory and to maintain a transactional memory log. Examples of operating systems 114 include UNIX, versions of the Microsoft Windows® operating system, and distributions of the Linux® operating system. (Note: Linux is at trademark of Linus Torvalds in the United States and other countries.) More generally, any operating system 114 supporting the functions disclosed herein may be used.

Illustratively, memory 108 includes an application 112. In one embodiment, application 112 may be multi-threaded. That is, application 112 may include multiple execution threads. In one embodiment, the same process may have multiple threads, where each thread has access to the same process. Further, each thread may have its own stack space and may be scheduled for execution independently from others. Thread scheduling may be managed by application 112 or operating system 114. Moreover, threads typically may be preempted; that is, an executing thread may be interrupted by a trap event. Typically, each trap event has a default action, usually to terminate a running process, although application 112 may be coded to override such default actions and handle a trap event more gracefully. As stated, however, if a trap event occurs in the middle of a transaction, data structures may be left in an inconsistent state, leading to incorrect program results or abnormal program termination.

The computer system 102 illustrated in FIG. 1 is merely an example of one computing environment. Embodiments of the present invention may be implemented using other environments, regardless of whether the computer systems are complex multi-user computing systems, such as a cluster of individual computers connected by a high-speed network or single-user workstations. Further, the software applications and operating system illustrated in FIG. 1 and described herein may be implemented using applications and operating systems executing on existing computer systems, e.g., desktop computers, server computers, laptop computers, tablet computers, and the like. However, the applications and operating systems described herein are not limited to any currently existing computing environment or programming language, and may be adapted to take advantage of new computing systems as they become available. Further, the transactional memory manager 116 may be implemented in hardware, software, or a combination of the two.

Figure 2:
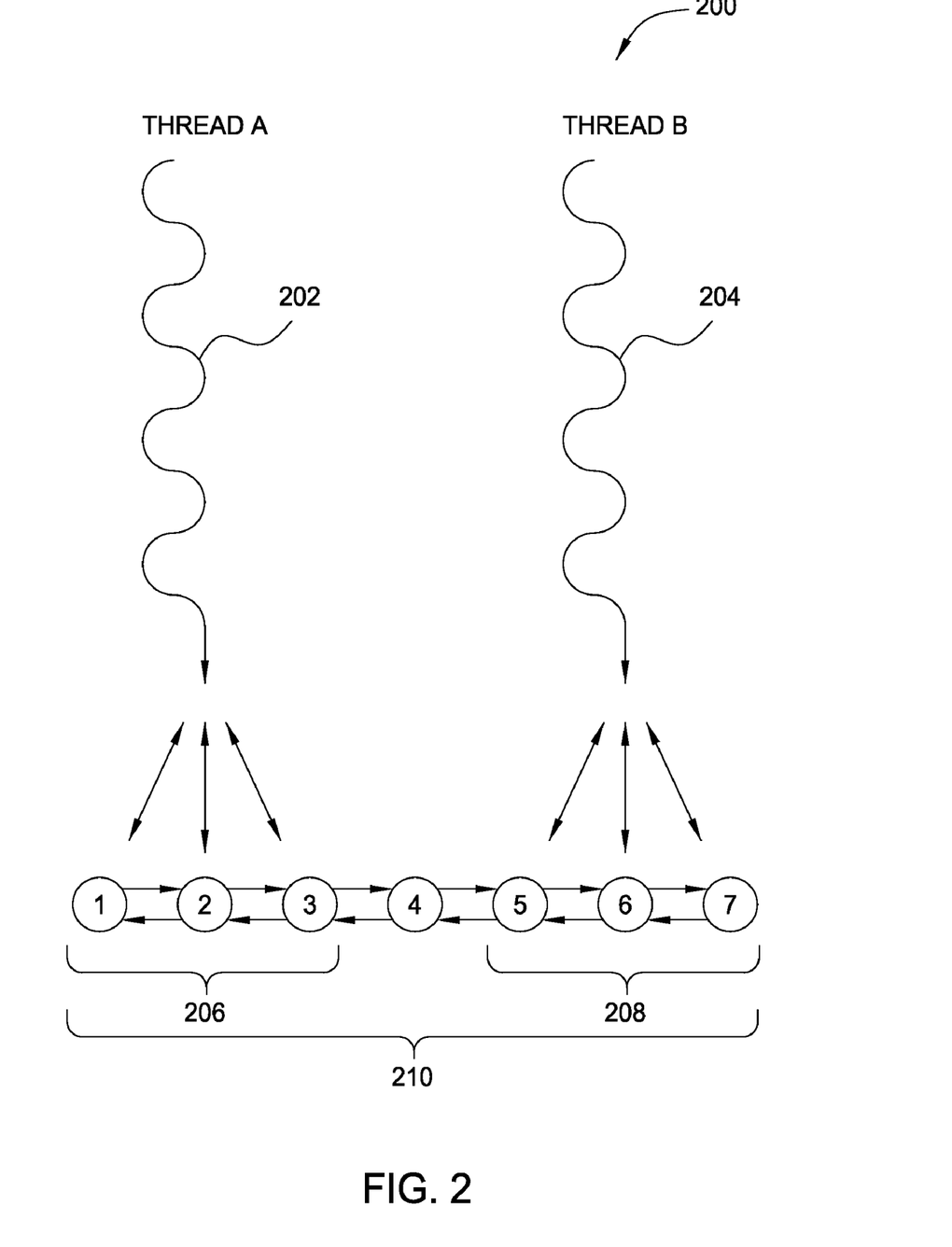
FIG. 2 is a diagram illustrating how multiple threads may access the same data structure, according to one embodiment of the invention.

FIG. 2 is a diagram illustrating how multiple threads may access the same data structure, according to one embodiment of the invention. In this example, thread A 202 and thread B 204 are each accessing the same data structure, in this case, doubly-linked list 210 stored in transactional memory. As stated, transactional memory does not require the linked list 210 to be locked when a thread A 202 or thread B 204 accesses this data structure. Instead, so long as threads 202 and 204 do not access the same nodes of the linked list 210, each may access the linked list essentially simultaneously (e.g., while executing on different CPU cores). Thus, thread A is shown modifying a first portion 206 of the linked list 210 that includes the first three nodes, while at the same time thread B is modifying a second portion 208 of the linked list 210 that includes the last three nodes. A transactional memory log may record each change to the transactional memory, in case the changes need to be undone due to memory conflicts, e.g., where both threads access the same memory addresses.

Figure 3:
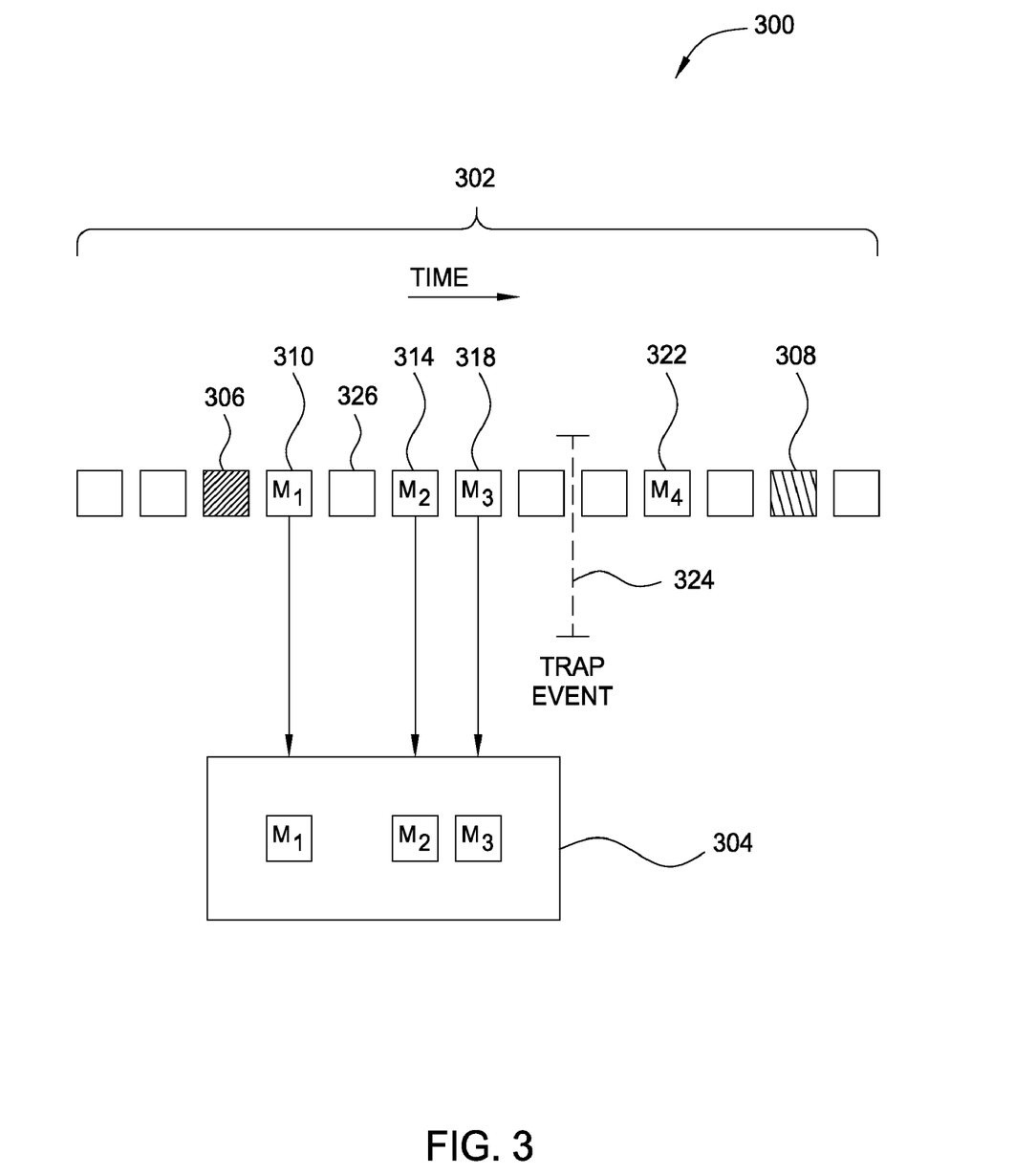
FIG. 3 is a diagram illustrating a sequence of instructions executed by a thread and recorded in a transactional memory log, according to one embodiment of the invention.

FIG. 3 is a diagram 300 illustrating a sequence 302 of instructions executed by a thread and recorded in a transactional memory log 304, according to one embodiment of the invention. In this example, each block in the sequence 302 represents an instruction, executed sequentially from right-to-left. An instruction 306 is used to specify the beginning of a transaction to be recorded in the memory log 304. At the end of the transaction, another instruction 308 closes the memory log 304. In one embodiment, instructions which do not affect memory, e.g., an instruction 326, are not recorded in the log 304. In contrast, instructions that do alter memory, such as instructions 310, 312, and 318 labeled M1, M2, and M3, are recorded in the transactional memory log 304. In this example, a trap event 324 occurs after instruction 318. Accordingly, subsequent instructions (e.g., instruction 322 labeled M4) are not reached. Instead, the transactional memory manager 116 can use the transaction log 304 to restore memory state as it existed at instruction 306, the point where the transaction was initiated. The transactional memory manager may be hardware based, software based, or based on some combination thereof (e.g., firmware). In the example of FIG. 3, memory changes made by instructions 318, 314, and 310 are rolled back, in that order.

Figure 4:
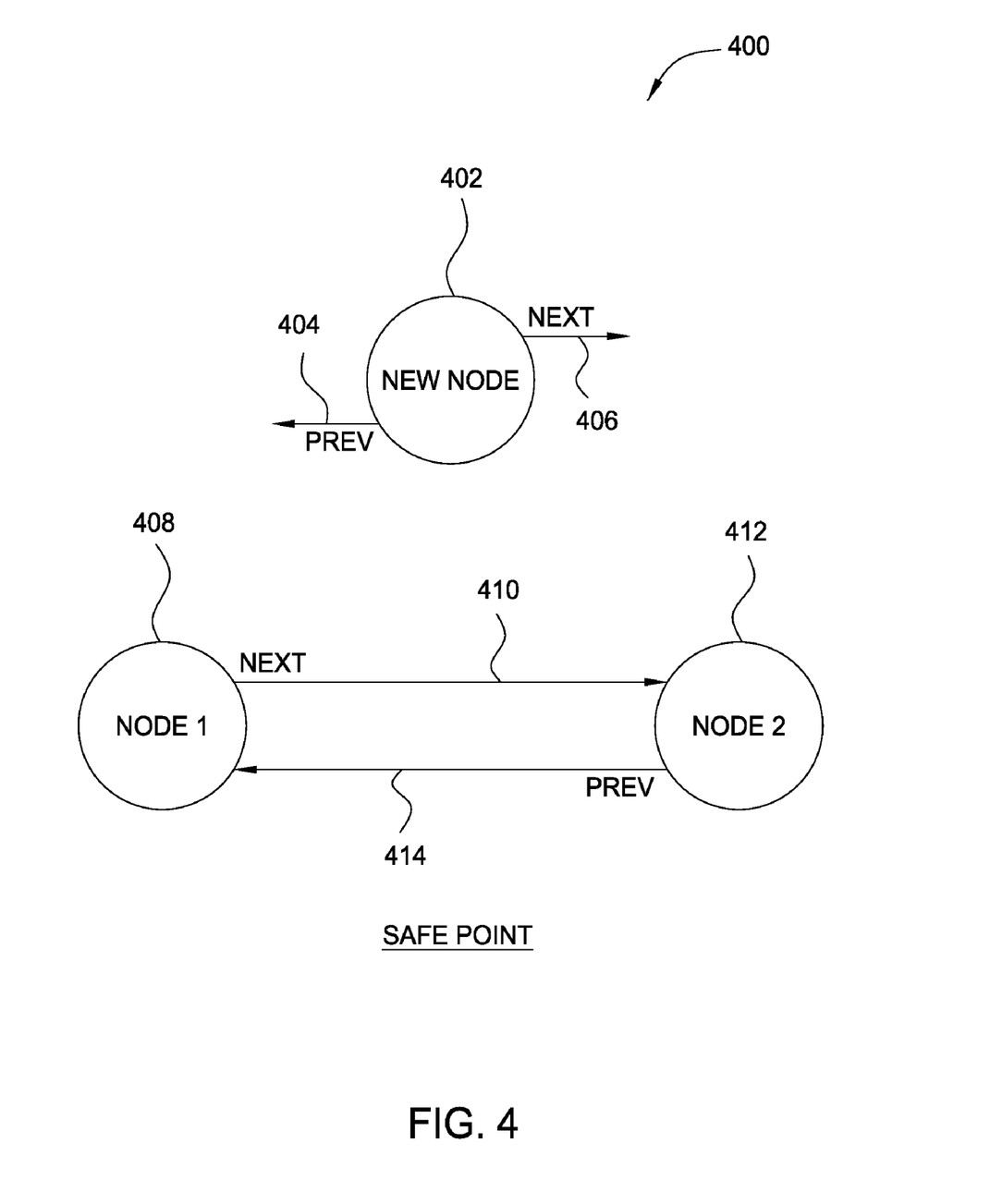
FIG. 4 is an illustration of an initial state of a data structure stored in shared memory prior to initiating a transaction, according to one embodiment of the invention.

FIG. 4 is an illustration of an initial state of a data structure 400 stored in shared memory prior to initiating a transaction, according to one embodiment of the invention. As shown, data structure 410 represents a doubly linked list and includes a Node1 408 and a node2 412. Each node stores a value for a "next" and "previous" pointer. Node1's next pointer 410 is assigned to node2 412. Node2's previous pointer 414 is assigned to node1. The previous pointer 404 and next 406 pointer for newNode 402 do not point to any other node, so their values are set to "null."

Figure 5:
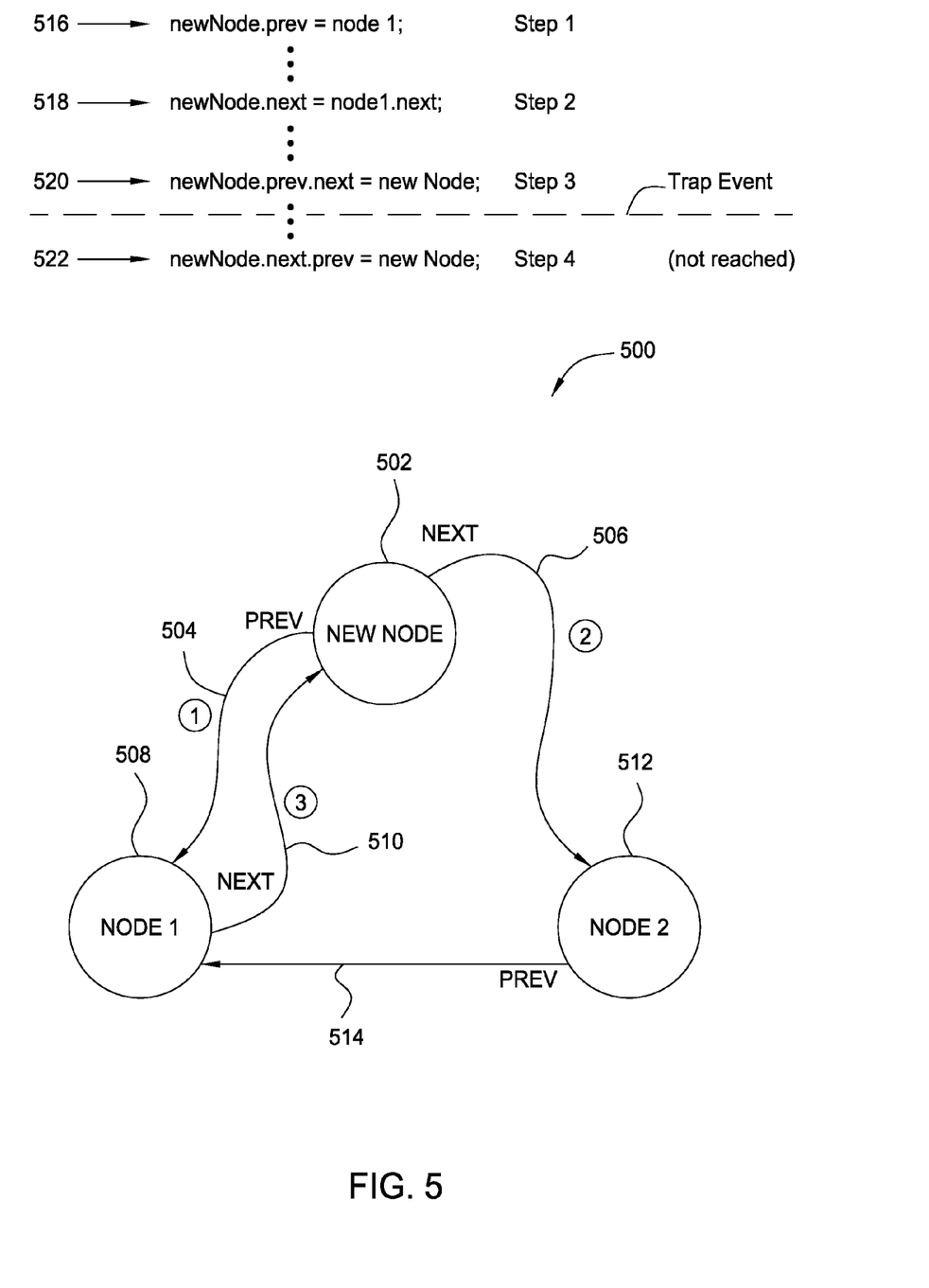
FIG. 5 is an illustration of an altered memory state of the linked list, according to one embodiment of the invention.

FIG. 5 is an illustration of steps 516-522 that alter the memory state of a linked list 5000, according to one embodiment of the invention. The lines of code 516-522 provide the steps to insert newNode 502 in between node1 508 and node2 512. In step 516, newNode's 502 previous pointer 504 is assigned to node1. In step 518, newNode's 502 next pointer 506 is assigned to node2. In step 520, node1's next pointer 510 is assigned to newNode 502. At some point between step 520 and step 522, assume a trap occurs. Because of the trap, node2's 512 previous pointer 514 does not get assigned to newNode 502, and instead remains a pointer to null. Therefore, the linked list is in an inconsistent state at the time of the trap.

Figure 6:
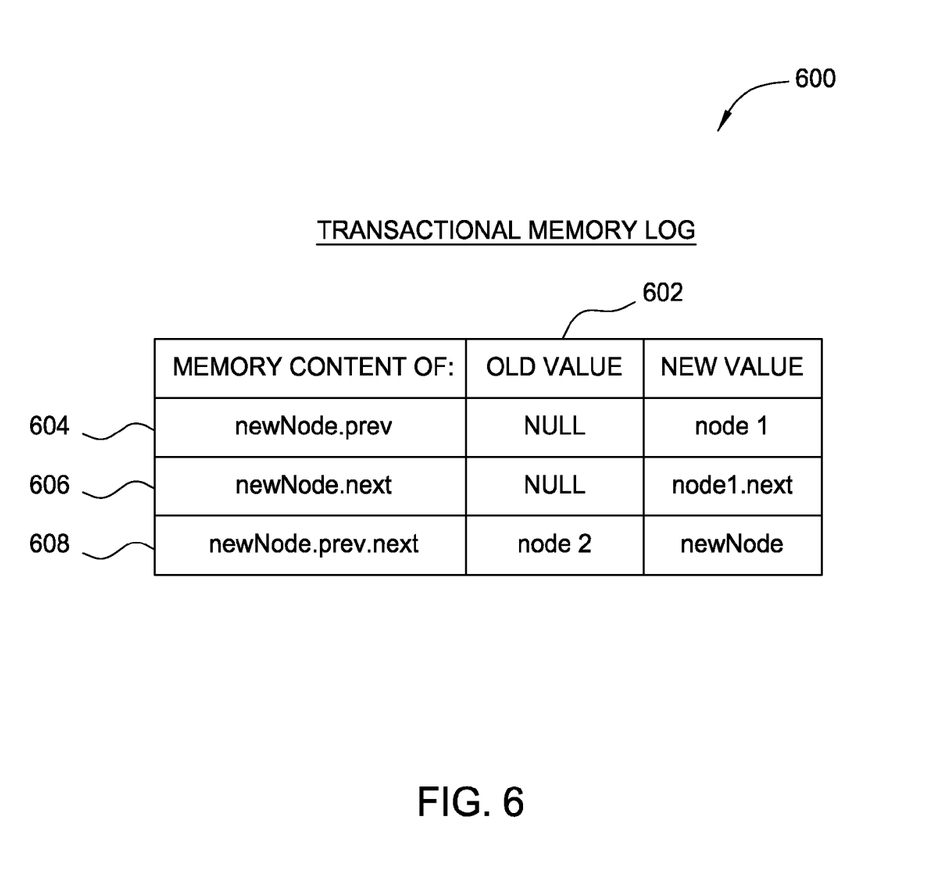
FIG. 6 is an illustration of the contents of a transactional memory log, according to one embodiment of the invention.

FIG. 6 is an illustration 600 of the contents of the transactional memory log 602, according to one embodiment of the invention. In this example, transactional memory log 602 records the events preformed as part of adding the newNode element to the linked list shown in FIG. 5 prior to the trap event. As shown, the first row of the log 604 contains the old value and the new value of newNode's previous pointer. The second row 606 contains the old value and the new value of newNode's next pointer. Finally, the last row 608 contains the old value and the new value of node1's next pointer.

Figure 7:
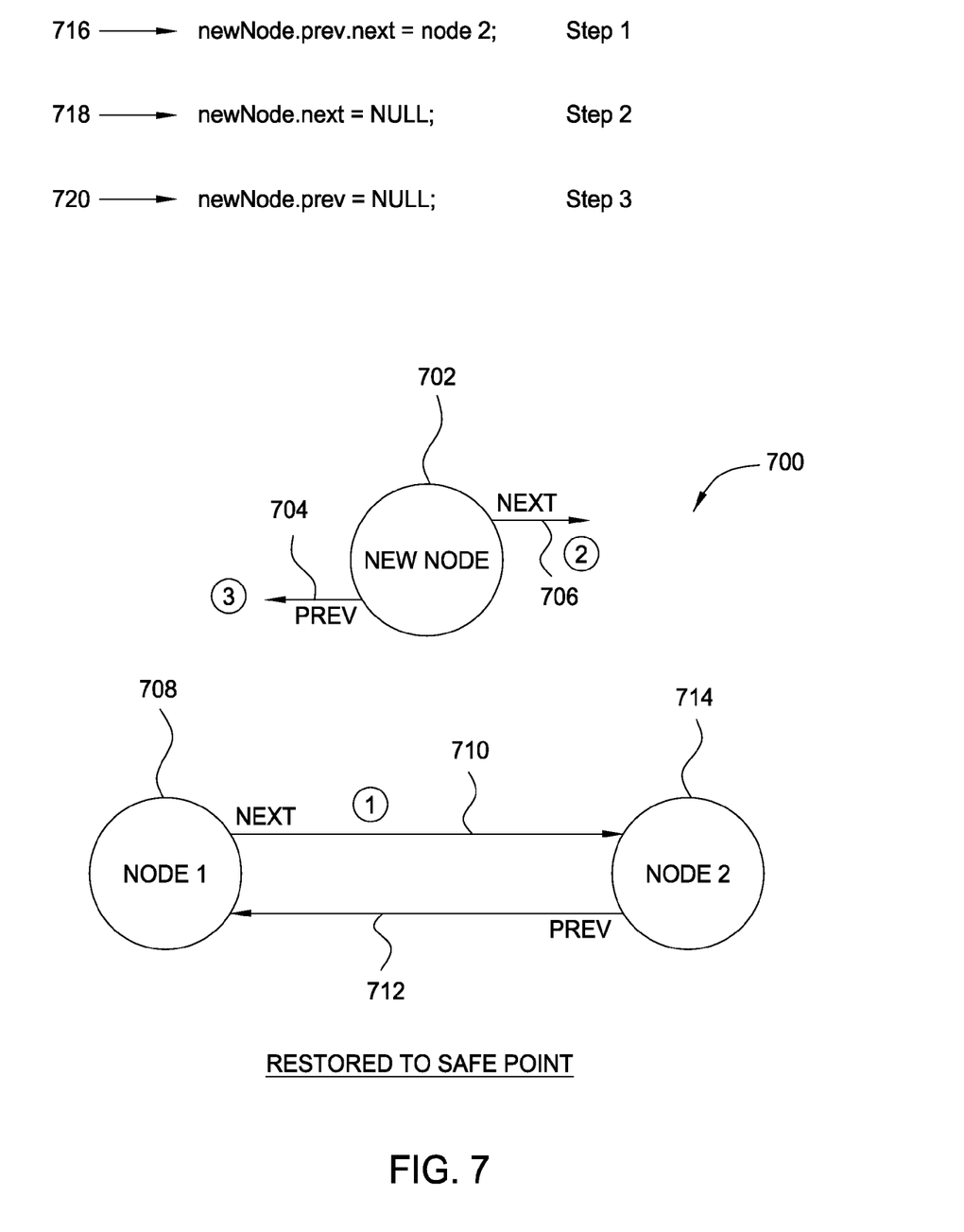
FIG. 7 is an illustration of a restored memory state, according to one embodiment of the invention.

FIG. 7 is an illustration of steps 700 performed to restore the memory state of the linked list shown in FIGS. 4 and 5, according to one embodiment of the invention. In one embodiment, because the trap occurred as part of a transaction, the transaction is aborted and rolled back before executing a function to handle the trap event. Further, once the trap handling function completes, program control may be returned to the beginning point of the transaction. In one embodiment, the transactional memory log 602 of FIG. 6 may be parsed in reverse order to restore memory values the state existing when the transaction was initiated. Illustratively, lines of code 716, 718, and 720 represent the steps to restore the memory. At step 716, node1's 708 next pointer 710 is assigned to node 2 714. At step 718, newNode's 702 next pointer 706 is assigned to "null." At step 720, newNode's 702 previous pointer 704 is assigned to "null."

Figure 8:
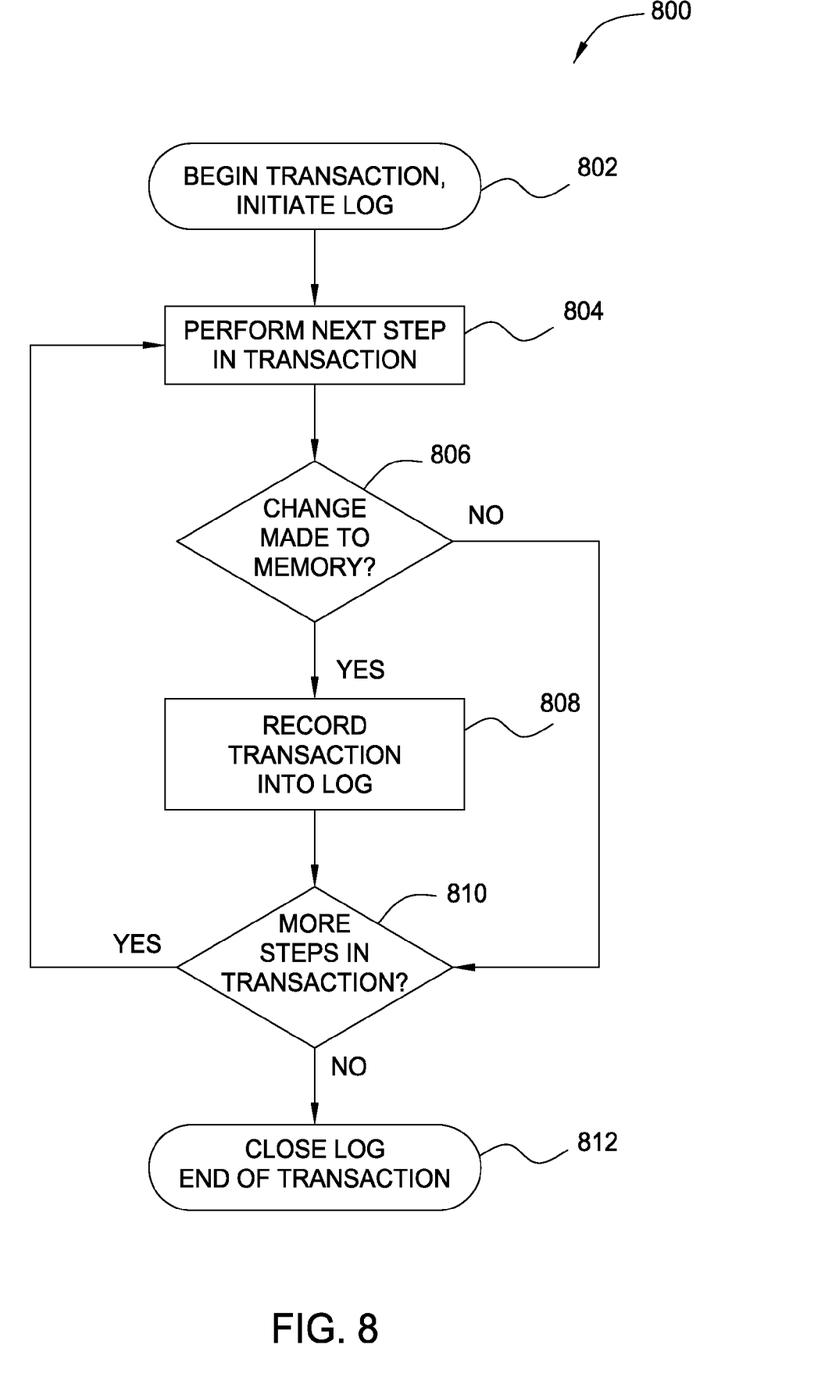
FIG. 8 is a flow diagram illustrating a method for generating a transactional memory log, according to one embodiment of the invention.

FIG. 8 is a flow diagram illustrating a method 800 for building a transactional memory log, according to one embodiment of the invention. As shown, the method 800 begins at step 802, where the transaction begins and a transaction memory log is opened to record memory changes that occur as part of the transaction. At step 804, the next instruction of the transaction is performed. At step 806, if there is no change to memory, the flow proceeds to step 810. However, if there was a change made to memory, then at step 808 the transactional memory manager may record the memory changes in a transaction log. At step 810, if there are more steps in the transaction, the flow proceeds to step 804, where the next step of the transaction is performed. If there are no more steps in the transaction, then at step 812, the transactional memory manager closes the log, completing the transaction.

Figure 9:
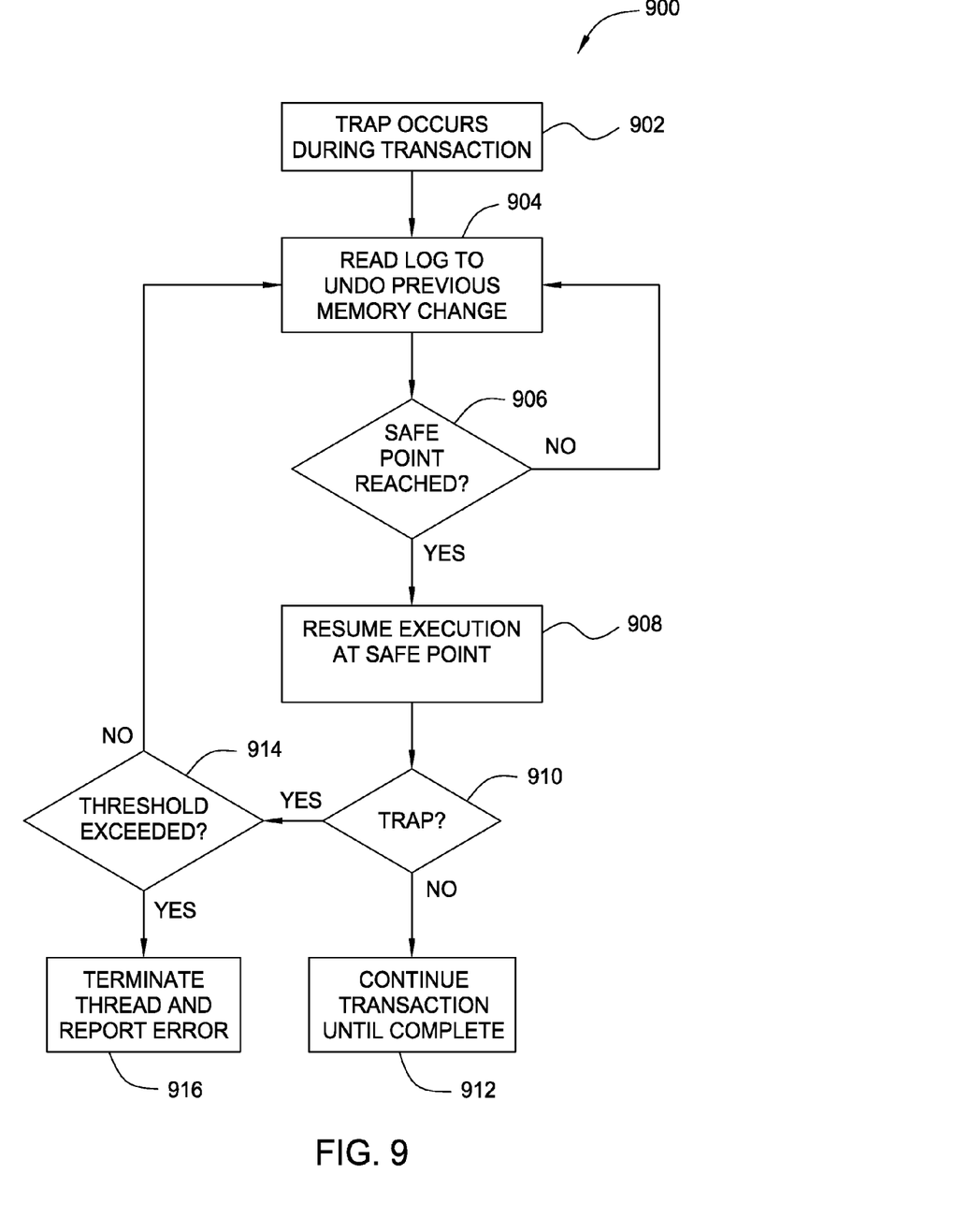
FIG. 9 is a flow diagram illustrating a method for regaining memory consistency after a trap via transactional memory, according to one embodiment of the invention.

FIG. 9 is a flow diagram illustrating a method 900 for regaining memory consistency after a trap via transactional memory, according to one embodiment of the invention. As shown, the method 900 begins at step 902, where a trap occurs during an active transaction being performed using transactional memory. As stated, a variety of events may generate a trap, including invalid memory references, divide-by-zero errors, hardware events, and user-generated interrupts. At step 904, a transactional memory manager may read the transactional memory log to undo any memory changes made by the most recent entry in the transactional log. At step 906, the transactional memory manager determines whether a safe point has been reached (the point where the transaction began). If not, then the flow proceeds to step 904, where the transactional memory manager rolls back additional entries in the log. If the safe point has been reached, then at step 908, the program resumes execution after a trap handler function handles the trap. If there are no more traps, the transaction continues to completion (step 912). However, if a trap occurs again, the flow proceeds to step 914, where the transaction memory manager may determine whether the number of traps has exceeded a predetermined threshold. If so, then the thread executing the transaction may be terminated. This allows the memory manager to avoid an infinite loop. If the threshold has not been exceeded, then the flow continues to step 904, and flow continues as described above. Along with the threshold value, other details may be provided to indicate "why" the code is back at the beginning. For example, a numeric value may be used to indicate the type of error that caused the trap. In such case, the program may specify how to process different trap codes to decide whether to give up or perform some alternative to repeating a transaction that previously resulted in a trap event.

Advantageously, embodiments of the invention provide a method to undo changes made to memory as part of a multi-step transaction that should either complete fully or be aborted, e.g., to maintain data structure consistency. Furthermore, embodiments of the invention provide a method to re-execute a program after a trap. Conventional locking techniques can prevent more than one thread from accessing a data structure. However, using transactional memory and a transactional memory log allows multiple threads to access the same data structure simultaneously. This may be particularly useful when there are a large number of threads that require access to the same data structure.

While the foregoing is directed to embodiments of the present invention, other and further embodiments of the invention may be devised without departing from the basic scope thereof, and the scope thereof is determined by the claims that follow.

What is claimed is:

1. A method for regaining memory consistency after a trap event, the method comprising:
   initiating, by a thread, a transaction including a plurality of instructions;
   recording a sequence of changes made to memory while executing the plurality of instructions;
   detecting an occurrence of a trap event prior to completing the transaction;
   passing an error code to the thread indicating a type of error that caused the trap event;
   rolling back the sequence of changes made to the memory up to a first instruction of the transaction, based on the recorded sequence; and
   resuming execution of the thread at the first instruction of the transaction.

2. The method of claim 1, further comprising invoking a trap-handler associated with the trap event prior to resuming execution of the thread at the first instruction of the transaction.

3. The method of claim 1, further comprising:
   determining whether the transaction has been initiated and rolled back, on the basis of the trap event, more than a specified a number of times; and
   terminating the thread if the number of interruptions has exceeded a predetermined threshold.

4. The method of claim 1, wherein the transactional memory is software-based transactional memory.

5. The method of claim 1, wherein the transactional memory is hardware-based transactional memory.

6. The method of claim 1, wherein the trap event is generated in response to one of an invalid memory reference, a divide-by-zero error, a hardware event, and a user-generated interrupt.

7. The method of claim 1, wherein the plurality of instructions included in the transaction represent an atomic sequence of steps to be performed without interruption.

8. The method of claim 1, wherein passing the error code to the thread indicating the type of error that caused the trap event occurs prior to the execution of the thread at the first instruction of the transaction being resumed.

9. A computer-readable storage medium containing a program that when executed performs an operation for regaining memory consistency after a trap event, the operation comprising:
   initiating, by a thread, a transaction including a plurality of instructions;

recording a sequence of changes made to memory while executing the plurality of instructions;

detecting an occurrence of a trap event prior to completing the transaction;

passing an error code to the thread indicating a type of error that caused the trap event;

rolling back the sequence of changes made to the memory up to a first instruction of the transaction, based on the recorded sequence; and resuming execution of the thread at the first instruction of the transaction.

10. The computer-readable storage medium of claim 9, wherein the operation further comprises-invoking a trap-handler associated with the trap event prior to resuming execution of the thread at the first instruction of the transaction.

11. The computer-readable storage medium of claim 9, wherein the operation further comprises:
    determining whether the transaction has been initiated and rolled back, on the basis of the trap event, more than a specified a number of times; and
    terminating the thread if the number of interruptions has exceeded a predetermined threshold.

12. The computer-readable storage medium of claim 9, wherein the transactional memory is software-based transactional memory.

13. The computer-readable storage medium of claim 9, wherein the transactional memory is hardware-based transactional memory.

14. The computer-readable storage medium of claim 9, wherein the trap event is generated in response to one of an invalid memory reference, a divide-by-zero error, a hardware event, and a user-generated interrupt.

15. The computer-readable storage medium of claim 9, wherein the plurality of instructions included in the transaction represent an atomic sequence of steps to be performed without interruption.

16. The computer-readable storage medium of claim 9, wherein passing the error code to the thread indicating the type of error that caused the trap event occurs prior to the execution of the thread at the first instruction of the transaction being resumed.

17. A system comprising:
    a processor;
    a transactional memory; and
    a transactional memory manager configured to perform an operation for regaining memory consistency after a trap event via the transactional memory, the operation comprising:
        initiating, by a thread, a transaction including a plurality of instructions;
        recording a sequence of changes made to the transactional memory while executing the plurality of instructions;
        detecting an occurrence of a trap event prior to completing the transaction;
        passing an error code to the thread indicating a type of error that caused the trap event;
        rolling back the sequence of changes made to the transactional memory up to a first instruction of the transaction, based on the recorded sequence; and
        resuming execution of the thread at the first instruction of the transaction.

18. The system of claim 17, wherein the operation further comprises invoking a trap-handler associated with the trap event prior to resuming execution of the thread at the first instruction of the transaction.

19. The system of claim 17, wherein the operation further comprises:
    determining whether the transaction has been initiated and rolled back, on the basis of the trap event, more than a specified a number of times; and
    terminating the thread if the number of interruptions has exceeded a predetermined threshold.

20. The system of claim 17, wherein the transactional memory is software-based transactional memory.

21. The system of claim 17, wherein the transactional memory is hardware-based transactional memory.

22. The system of claim 17, wherein the trap event is generated in response to one of an invalid memory reference, a divide-by-zero error, a hardware event, and a user-generated interrupt.

23. The system of claim 17, wherein the plurality of instructions included in the transaction represent an atomic sequence of steps to be performed without interruption.

24. The system of claim 17, wherein passing the error code to the thread indicating the type of error that caused the trap event occurs prior to the execution of the thread at the first instruction of the transaction being resumed.

* * * * *